US010699268B2

(12) United States Patent
Hugot (10) Patent No.: US 10,699,268 B2
(45) Date of Patent: Jun. 30, 2020

(54) METHOD, SERVER AND SYSTEM FOR AUTHORIZING A TRANSACTION

(71) Applicant: GEMALTO, INC., Austin, TX (US)

(72) Inventor: Didier Hugot, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 890 days.

(21) Appl. No.: 14/984,804

(22) Filed: Dec. 30, 2015

(65) Prior Publication Data
US 2017/0193500 A1    Jul. 6, 2017

(51) Int. Cl.
*G06Q 20/38* (2012.01)
*G06Q 20/20* (2012.01)
(Continued)

(52) U.S. Cl.
CPC ......... *G06Q 20/3821* (2013.01); *G06Q 20/12* (2013.01); *G06Q 20/20* (2013.01);
(Continued)

(58) Field of Classification Search
CPC ................................................ G06Q 20/3821
See application file for complete search history.

(56) References Cited

U.S. PATENT DOCUMENTS 4,529,870 A * 7/1985 Chaum ............... G06K 19/07
235/379
5,794,230 A * 8/1998 Horadan ............. G06Q 20/105
235/380
(Continued)

FOREIGN PATENT DOCUMENTS

EP    2897094 A1    7/2015
WO    2009/066265 A1    5/2009
(Continued)

OTHER PUBLICATIONS

International Search Report of the International Searching Authority (Form PCT/ISA/210) dated Feb. 28, 2017, by the European Patent Office as the International Searching Authority in corresponding International Application No. PCT/EP2016/081549. (4 pages).
(Continued)

*Primary Examiner* — Jacob C. Coppola
(74) *Attorney, Agent, or Firm* — Buchanan Ingersoll & Rooney PC (57) ABSTRACT

To authorize a transaction, a first device sends to a first server a transaction-authorization request accompanied with an Id-PAN relating to a user account, and including an identifier of a second device. The first server sends to a second server a user-authorization request accompanied with the Id-PAN and transaction data. The second server sends to the second device a request for user approval including the transaction data and the user account data. The second device requests whether the device user approves a requested transaction. The second device sends to the second server a request for authorizing the transaction and data relating to user approval. The second server verifies whether the requested transaction is approved by the user. The second server sends to a server a verification result including a transaction authorization or refusal.

8 Claims, 2 Drawing Sheets

(51) Int. Cl.
*G06Q 20/12* (2012.01)
*G06Q 20/40* (2012.01)
*G06Q 20/42* (2012.01)
*G06Q 20/32* (2012.01)

(52) U.S. Cl.
CPC ......... *G06Q 20/325* (2013.01); *G06Q 20/401* (2013.01); *G06Q 20/4014* (2013.01); *G06Q 20/4018* (2013.01); *G06Q 20/40145* (2013.01); *G06Q 20/425* (2013.01)

(56) References Cited

U.S. PATENT DOCUMENTS

| | | | | |
|---|---|---|---|---|
| 6,324,525 B1* | 11/2001 | Kramer | ............ | G06Q 20/00 705/40 |
| 8,768,838 B1* | 7/2014 | Hoffman | ............ | G06Q 40/00 705/44 |
| 8,768,848 B2* | 7/2014 | Oyama | ............ | B60K 6/445 477/116 |
| 2007/0022058 A1* | 1/2007 | Labrou | ............ | G06Q 20/32 705/67 |
| 2010/0017334 A1 | 1/2010 | Itoi et al. | | |
| 2010/0057616 A1 | 3/2010 | Kapur et al. | | |
| 2010/0125737 A1* | 5/2010 | Kang | ............ | G06Q 20/12 713/176 |
| 2010/0293189 A1 | 11/2010 | Hammad | | |
| 2010/0312703 A1* | 12/2010 | Kulpati | ............ | G06Q 20/32 705/44 |
| 2011/0208658 A1 | 8/2011 | Makhotin | | |
| 2012/0143768 A1 | 6/2012 | Hammad | | |
| 2012/0173348 A1* | 7/2012 | Yoo | ............ | G06Q 20/10 705/16 |
| 2012/0173413 A1* | 7/2012 | Yoo | ............ | G06Q 20/10 705/39 |
| 2013/0226717 A1 | 8/2013 | Ahluwalia | | |
| 2013/0238498 A1* | 9/2013 | Forsyth | ............ | G06Q 20/18 705/43 |
| 2013/0238499 A1* | 9/2013 | Hammad | ............ | G06Q 20/3224 705/44 |
| 2014/0052553 A1* | 2/2014 | Uzo | ............ | G06Q 20/204 705/18 |
| 2014/0052638 A1* | 2/2014 | Chung | ............ | G06Q 20/322 705/44 |
| 2014/0108249 A1* | 4/2014 | Kulpati | ............ | G06Q 20/3223 705/44 |
| 2014/0358777 A1* | 12/2014 | Gueh | ............ | G06Q 20/3223 705/43 |
| 2015/0046331 A1* | 2/2015 | Gupta | ............ | G06Q 20/10 705/44 |
| 2016/0180321 A1* | 6/2016 | Gupta | ............ | G06Q 20/322 705/72 |

FOREIGN PATENT DOCUMENTS

WO  2013/064493 A1  5/2013
WO  2014/008920 A1  1/2014

OTHER PUBLICATIONS

Office Action (Communication pursuant to Article 94(3) EPC) dated Dec. 12, 2019 by the European Patent Office in corresponding European Patent Application No. 16813064.9. (7 pages).

* cited by examiner

METHOD, SERVER AND SYSTEM FOR AUTHORIZING A TRANSACTION

FIELD OF THE INVENTION

The invention relates generally to a method for authorizing a transaction.

Furthermore, the invention also pertains to a server for authorizing a transaction.

Lastly, the invention relates to a system for authorizing a transaction as well.

STATE OF THE ART

As known per se, a user of a bank card reads a Primary Account Number (or PAN), a Card Verification Value (or CVV) and an Expiration Date (or ED), as card data printed on the bank card. Then, the user provides a merchant server with read data, so as to perform an on-line payment transaction, as a Card Non Present (or CNP) transaction in the e-commerce. A Point Of Sale (or POS) terminal reads, from a magnetic stripe of a bank card, card data and sends it, through a merchant infrastructure, to a bank (card) issuer system, so as to perform a payment transaction on site, like in a shop. The PAN allows identifying a bank account of the bank card user. The CVV and the ED are used for securing the payment transaction.

However, such a known solution is not secured enough notably due to an easy access to the card data. The known solution is therefore particularly sensitive to fraud since a user different from the card owner may use the card data without that the card owner is aware of its use.

Thus, there is a need to provide a solution that allows securing a payment transaction without modifying a merchant infrastructure.

SUMMARY OF THE INVENTION

The invention proposes a solution for satisfying the just herein above specified need by providing a method for authorizing a transaction.

According to the invention, the method comprises the following steps. A first device sends to a first server a first message including a request for authorizing a transaction accompanied with an Id-PAN, as an identifier relating to a user account, the Id-PAN, as a second device identifier-PAN, including at least in part an identifier relating to a second device. The second device identifier allows addressing the second device. The first server sends to a second server a second message including a request for a user authorization for the transaction accompanied with the Id-PAN and transaction data. The second server accesses the transaction data, the Id-PAN, an associated PAN or identifier relating to a user account and an associated DPAN or the like, as data relating to a user account. The second server retrieves, based upon the Id-PAN, the second device identifier. The second server gets, based upon the Id-PAN, the DPAN or the like. The second server sends, based upon the second device identifier, to the second device a third message including a request for getting a user approval relating to the transaction accompanied with the transaction data and the DPAN or the like. The second device requests a user whether the device user does or does not approve a requested transaction authorization. The second device sends to the second server a fourth message including a request for authorizing the transaction accompanied with data relating to a user approval. The second server determines, based upon the data relating to a user approval, a user approval result, and sends to the first server a fifth message including a response for authorizing the transaction accompanied with the user approval result and the Id-PAN. The first server sends to the second server a sixth message including a request for authorizing the transaction accompanied with the Id-PAN. The second server verifies, based upon the Id-PAN, whether the requested transaction is or is not approved by the user. The second server sends to a server a seventh message including a verification result, the verification result including a transaction authorization or a transaction refusal.

The principle of the invention consists in that, when a user requests a transaction to a first server, a first device sends an identifier relating to a second device included at least in part within an identifier relating to a user account, so as to request from a second server, through the identified second device, an approval to the second device user. Thus, the user is aware of a transaction that is in progress. The second server receives from the second device data relating to a user approval result. The second server verifies, based on the received data, whether the user gives (or not) her or his approval through the second device. The second server sends to a server, like e.g. the first server or another server, a transaction authorization (or refusal), so as to authorize (or not respectively) to perform a requested transaction.

The second device may be a (user) terminal, an embedded chip or a smart card, as a Secure Element (or SE).

Within the present description, an SE is a smart object or device that includes a chip that protects, as a tamper resistant component, physically access to stored data and is intended to communicate data with the outside world.

The SE chip may be fixed to or removable from the device.

The invention is notably applicable to a mobile radio-communication field wherein the second device is a mobile terminal or a chip that may be embedded, such as an embedded Universal Integrated Circuit Card (or eUICC) within a host device, or removable from a host device, like e.g. a chip included within a smart card such as a Subscriber Identity Module (or SIM) type card or the like, as an SE.

The invention does not impose any constraint as to a kind of the SE type.

As a removable SE, it may be a Secure Removable Module (or SRM), a smart dongle of the USB (acronym for "Universal Serial Bus") type, a (micro-) Secure Digital (or SD) type card or a Multi-Media type Card (or MMC) or any format card to be coupled or connected to a chip host device.

As to the chip host device, it may be constituted by any electronic device comprising data processing means, data storing means and one or several Input/Output (or I/O) communication interfaces, like e.g. a user terminal or a terminal.

The user remembers more easily the identifier relating to her/his user account, like e.g. a PAN or the like, since the user account identifier incorporates at least part of an identifier relating to her/his second device, like e.g. a Mobile Station International Subscriber Directory Number (or MSISDN), as a phone number.

The invention solution is therefore user friendly.

The invention solution allows using a modified identifier relating to a user account from which the second device identifier is retrieved by a second server to address a user device to be used by its user to give (or not) her/his approval.

The invention solution is compliant with existing technologies, like e.g. a 3D secure type solution.

The invention solution allows improving a security aspect relating to a requested transaction by having an explicit user approval (or refusal) through a user device that is identified within the identifier relating to a user account.

The invention solution leverages on an existing merchant (or retailer) server, as a first server.

The invention solution is compatible notably with the existing merchant infrastructure.

Such an invention transaction authorization method allows re-using an existing bank infrastructure reducing thus a technical complexity to offer a secure transaction authorization service.

The invention solution also leverages on an existing back-end system infrastructure.

As the invention solution re-uses the existing back-end system infrastructure, the invention solution is simple and easy to implement.

To give an explicit user approval (or refusal), the user may press one or several keys relating to a Man Machine Interface (or MMI) relating or coupled to the second device.

Alternatively, to give an explicit user approval (or refusal), the user may provide user authentication data, such as data, like e.g. a Personal Identity Number (or PIN), that is known by the user and/or data, like e.g. one or several biometric prints, that belongs to the user, to be verified locally, i.e. at the second device side, or remotely, i.e. at the server side, possibly through a cryptogram computed by using the provided user authentication data.

The invention solution that uses such an additional user authentication allows further improving the security aspect relating to a requested transaction.

According to a further aspect, the invention is a second server for authorizing a transaction.

According to the invention, the second server is configured to receive a message including a request for a user authorization for a transaction accompanied with an Id-PAN, as an identifier relating to a user account, and transaction data. The Id-PAN includes at least in part an identifier relating to a second device. The second device identifier allows addressing the second device. The second server accesses the transaction data, the Id-PAN, an associated PAN or identifier relating to a user account and an associated DPAN or the like, as data relating to a user account. The second server is configured to retrieve, based upon the Id-PAN, the second device identifier, to get, based upon the Id-PAN, the DPAN or the like, and to send, based upon the second device identifier, a message including a request for getting a user approval relating to the transaction accompanied with the transaction data and the DPAN or the like. The second server is configured to receive a message including a request for authorizing the transaction accompanied with data relating to a user approval. The second server is configured to determine, based upon the data relating to a user approval, a user approval result. The second server is configured to send a message including a response for authorizing the transaction accompanied with the user approval result and the Id-PAN. The second server is configured to receive a message including a request for authorizing the transaction accompanied with the Id-PAN. The second server is configured to verify, based upon the Id-PAN, whether the requested transaction is or is not approved by the user. The second server is configured to send a message including a verification result, the verification result including a transaction authorization or a transaction refusal.

According to a further aspect, the invention is a system for authorizing a transaction.

According to the invention, the system comprises a first device, a second device, a first server and a second sever.

The first device is configured to send to a first server a first message including a request for authorizing a transaction accompanied with an Id-PAN, as an identifier relating to a user account, the Id-PAN including at least in part an identifier relating to a second device. The second device identifier allows addressing the second device. The first server is configured to send to a second server a second message including a request for a user authorization for the transaction accompanied with the Id-PAN and transaction data. The second server accesses the transaction data, the Id-PAN, an associated PAN or identifier relating to a user account and an associated DPAN or the like, as data relating to a user account. The second server is configured to retrieve, based upon the Id-PAN, the second device identifier. The second server is configured to get, based upon the Id-PAN, the DPAN or the like. The second server is configured to send, based upon the second device identifier, to the second device a third message including a request for getting a user approval relating to the transaction accompanied with the transaction data and the DPAN or the like. The second device is configured to request a user whether the device user does or does not approve a requested transaction authorization. The second device is configured to send to the second server a fourth message including a request for authorizing the requested transaction accompanied with data relating to a user approval. The second server is configured to determine, based upon the data relating to a user approval, a user approval result. The second server is configured to send to the first server a message including a response for authorizing the transaction accompanied with the user approval result and the Id-PAN. The first server is configured to send to the second server a sixth message including a request for authorizing a requested transaction accompanied with the Id-PAN. And the second server is configured to verify, based upon the Id-PAN, whether the requested transaction is or is not approved by the user. The second server is configured to send to a server a seventh message including a verification result. The verification result includes a transaction authorization or a transaction refusal.

It is noteworthy that a corresponding user approval application supported by the second device that allows carrying out the invention method at the client side may be based on any type, like e.g. an Europay Mastercard Visa (or EMV) or an Host Card Emulation (or HCE) type application.

The EMV type application may be stored and executed within a tampered resistant device, like e.g. an SE, or in a non-tampered resistant device, like e.g. a mobile (tele) phone.

The user approval application supported at a client device side is secured by using a user approval verification mechanism at a server side.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an embodiment in which the invention method for authorizing a transaction that is implemented notably by a PC, as a first device, and a mobile phone, as a second device, a merchant server, as a first server, and a user approval verification server, as a second server.

The second device, like e.g. a mobile user terminal, that supports an invention user approval application does not cooperate locally with any other device, so as to request a user approval and issue notably data relating to a user approval or refusal.

According to another embodiment, instead of the phone, as a standalone entity, the phone cooperates locally with another device, like e.g. an SE, as a cooperating device, that supports an invention user approval application.

The SE may have different form factors.

The SE may be a chip, like e.g. an eUICC, soldered (possibly in a removable manner) on a Printed Circuit Board (or PCB) of a host terminal, a chip carried by a medium, such as a smart card or a dongle, like e.g. a USB type dongle, or a Trusted Execution Environment (or TEE) chip, as a secure area of a terminal processor and a secured runtime environment.

The SE may also incorporate at least part of the host terminal component(s), like e.g. a baseband processor, an application processor and/or other electronic component(s).

According to such an embodiment (not represented), the cooperating device is adapted to carry out functions that are described infra and carried out by the second device. Thus, a mobile phone, as a standalone entity, may support an invention user approval application that is stored in a non-tampered resistant device, i.e. in a non-trusted environment.

Naturally, the herein below described embodiment is only for exemplifying purposes and is not considered to reduce the scope of the invention.

Figure 1:
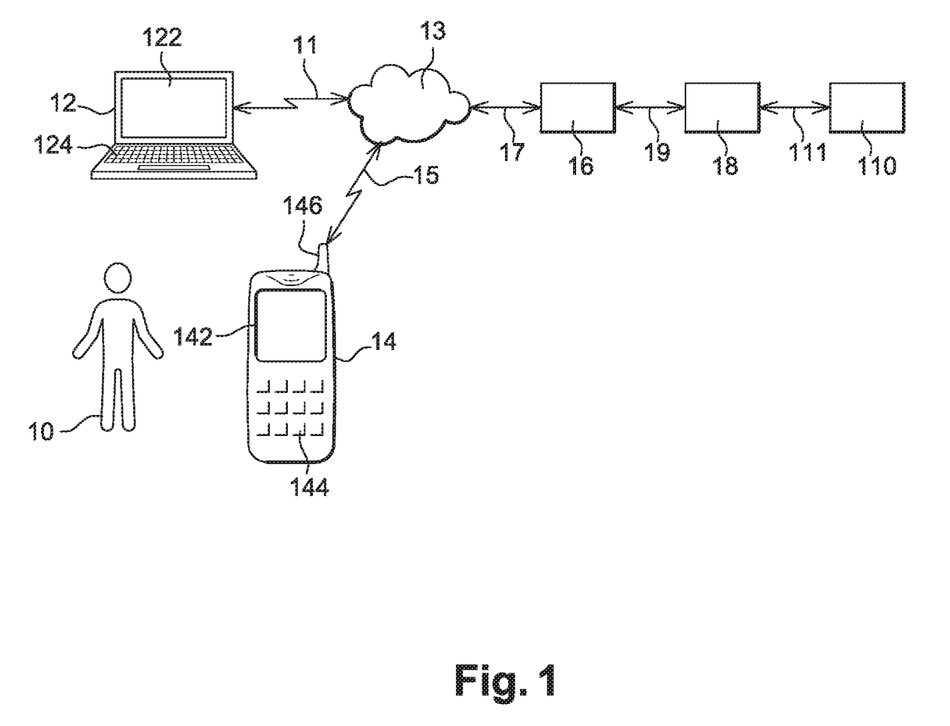
FIG. 1 is a simplified diagram of a PC that inserts within a PAN at least part of an MSISDN, as an identifier relating to a mobile phone and sends a request for authorizing a transaction with a resulting Id-PAN to a merchant server that sends a request for a user authorization for a transaction with the Id-PAN and transaction data to a user approval verification server that sends, based on the phone identifier, a user approval request with the transaction data and a DPAN, as data relating to a user account, and that receives a user approval result that is verified at the server side, so as to authorize a transaction, according to the invention.

FIG. 1 shows schematically a user 10, a Personal Computer 12, a network 13, a mobile phone 14, a first remote server 16, a payment network 18 and a second remote server 110.

For the sake of simplicity, the Personal Computer 12, the mobile phone 14, the first remote server 16 and the second remote server 110 are termed infra the PC 12, the phone 14, the first server 16 and the second server 110 respectively.

The user 10 accesses the PC 12, as a first device.

The first device 12 is used to request a transaction while involving the phone 14, as a second device, so as to request a user approval relating to a requested transaction.

Instead of a PC, the first device may be any other computer device comprising means for processing data, comprising (or being connected to) wire or Radio-Frequency (or RF) communication means, as an Input/Output (or I/O) interface(s), used for exchanging data with outside, like e.g. the first server 16, and comprising (or being connected to) means for storing data.

The first device 12, like e.g. a user terminal, may be either fixed (i.e. not mobile) or mobile.

The first device may be a Personal Digital Assistant (or PDA), a vehicle, a set-top box, a tablet computer, a desktop computer, a laptop computer, a mobile phone, a video player, an audio player, a portable TeleVision (or TV), a media-player, a game console, a netbook, an electronic mobile equipment or a device accessory (like e.g. glasses, a watch or a jewel).

The user 10 is able to carry out an on-line (payment) transaction with the first server 16, as a merchant server, by using the PC 12 and the phone 14 to communicate, through the second server 110, with a (payment transaction) acquirer (bank) system or infrastructure, based on a so-termed Card Not Present (or CNP) payment transaction. The on-line transaction is a transaction involving the PC and phone user 10, the first server 16, the second server 110, as a user approval verification server and preferably a server (not represented) that manages e.g. at least financially a bank user 10 account. The on-line transaction relates to a so-termed e-commerce (i.e. Over The Internet (or OTI)) or a mobile commerce (i.e. Over The Air (or OTA)) with a merchant.

According to another embodiment (not represented), the first device is able to cooperate locally, like e.g. within a store or a shop, with a POS type terminal (not represented) by using a Short Range (or SR) Radio-Frequency (or RF) link, as a ConTact-Less (or CTL) channel, so as to carry out a proximity (payment) transaction. The POS type terminal is connected to, besides a (payment transaction) issuer (bank) infrastructure (not represented) that includes a server that manages at least financially a bank user 10 account, a user approval verification server. The SR RF link frequency may be fixed at, for instance, 13.56 MHz, like e.g. with a Near Field Communication (or NFC) type technology (up to 20 cm between the phone and the POS type terminal) or the like (such as Bluetooth (registered Trademark), Bluetooth Low Energy (registered Trademark), and/or Zigbee (registered Trademark)).

Alternatively, instead of a user terminal, the first device is an SE (not represented) that is able preferably to communicate with the user 10 through a Man Machine Interface (or MMI) that is incorporated within or coupled to the first device and that is able to cooperate (through a CTL or a ConTact (or a CT) channel) with a Network Access Point (or NAP), like e.g. a set-top type box or a POS type terminal (not represented), with the first server 16 to carry out, through the second server 110, a proximity transaction with a server that manages e.g. a bank user 10 account.

The PC 12 includes preferably a display screen 122 and a keyboard 124, as a PC MMI.

Alternatively, instead of a physical keyboard separated from the display screen, the PC 12 is equipped with a touch sensitive display screen, as a virtual keyboard.

The PC MMI may allow the user 10 to provide data to be used for addressing the phone 14, as a second device, and also used for identifying a user account with the same data or Id-PAN.

The PC 12 supports preferably a browser (not represented) through which the user 10 interacts with the PC 12 and the first server 16 at the server side.

The PC 12 is configured to get part or all data relating to e.g. an MSISDN, as an identifier relating to the phone 14. The phone 14 identifier allows addressing the phone 14. As an identifier relating to the second device, it may be any other identifier that allows addressing the phone 14, like e.g. an Internet Protocol (or IP) address, a (user) subscription identifier, like e.g. an International Mobile Subscriber Identity (or IMSI), that is used by one or several devices relating to the user 10, so as to identify the user device(s) to be thus addressed.

To get the phone 14 identifier, the PC 12 is preferably arranged to request the user 10 part or all data relating to the phone 14 identifier.

Alternatively or additionally, to get the phone 14 identifier, the PC 12 is configured to retrieve part or all data relating to the phone 14 identifier that is accessible from the PC 12, i.e. stored within either a memory relating to the PC 12 or a memory of another device, like e.g. an SE (not represented), cooperating locally with the PC 12.

The user 10 may provide part or all data relating to the phone 14 identifier or part or all data relating to the user account identifier.

The user 10 may also provide all data relating to an identifier relating to a user account, as an Id-PAN, that includes part or all data relating to the phone 14 identifier.

The PC 12 may be adapted to insert part or all data relating to the phone 14 identifier within e.g. a Primary Account Number (or PAN), as an identifier relating to a user account.

The PC 12 may retrieve the user account identifier, from a PC memory or a memory of a device (not represented), like e.g. an SE, connected or coupled to the PC 12, that stores a PAN, a Dynamic Primary Account Number (or DPAN), as a (digital) token, a PAN alias and/or a PAN alternate, as data relating to the user account.

At least one of the user account identifiers is used for identifying, at the server side, a concerned bank user account or the like, in order to debit (financially) the bank user account, when the user approval has been provided by the user 10 and successfully verified by the second server 110.

Once the PC 12 has inserted part or all data relating to the phone identifier within the user account identifier, as a resulting user account identifier, as a phone Identifier-PAN or Id-PAN, or the PC 12 has been provided by the user 10 with the Id-PAN. The Id-PAN includes at least in part the phone Identifier.

The Id-PAN is entered by the user 10 and/or the PC 12 within a PAN data field of a first server page.

The Id-PAN constitutes a token-PAN in which a user account identifier is used to embed or incorporate at least in part the phone Identifier.

The Id-PAN data format may include from 9 to 12 digits, as the phone (or second device) identifier, as e.g. a Binary Coded Decimal (or BCD) format.

Depending on a data length constraint, the phone identifier may be in an international or national data format.

The phone identifier may be completed by one or several padding digits.

A CVV or a card number may be used to add three additional digits within the Id-PAN.

A card number is entered by the user 10 and/or the PC 12 within a CVV data field of the first server page.

The Id-PAN includes preferably a Bank Identification Number (or BIN) or an Issuer Identification Number (or IIN), as a bank issuer identifier. The bank issuer identifier allows identifying a server that manages at least financially the bank user account.

The Id-PAN data format may further include 6 digits, as the bank issuer identifier.

The Id-PAN data format may further include one check digit, like e.g. a Luhn check digit.

The PC 12 is connected, through a bi-directional link 11, to a network 13, like e.g. an Internet type network.

The PC 12 is able to send a message that includes a request for authorizing a transaction accompanied with the Id-PAN.

The phone 14 is able to use one or several Long Range (or LR) Radio-Frequency (or RF) links 15 for accessing, Over The Air (or OTA), through an antenna 126 and one or several communication networks 13, to the server side.

The LR RF may be fixed at several hundreds of MHz, for instance, around 850, 900, 1800, 1900 and/or 2100 MHz.

According to another embodiment (not represented), instead of using a mobile network(s), the phone or a terminal is connected, via a set-top box or the like, as a Network Access Point (or NAP), or Over The Internet (or OTI) to the server side.

The phone 14 comprises a (micro)processor(s), as means for processing data, a memory(ies), as means for storing data, and an I/O interface(s), as communication means for exchanging data with outside.

The phone memory may comprise one or several memories including one or several volatile memories and one or several non-volatile memories.

The phone memory(ies) stores an Operating System (or OS).

The phone memory(ies) (or a device, like e.g. an SE, cooperating with the phone 14) stores preferably one or several applications, among which there is an invention user approval application that uses a payment transaction application, like e.g. an Europay Mastercard and Visa (or EMV) type application.

The phone 14 is configured to receive a message including a request for getting a user approval relating to the transaction along with transaction data and a DPAN or the like, as data relating to a user account. The data relating to a user account is used for securing a transmission of the PAN, as the identifier relating to the user account, during a user approval phase.

The phone 14, as a user terminal, includes (or is connected or coupled to) a display screen 142 and a keyboard 144, as a phone MMI.

Alternatively, instead of a physical keyboard separated from the display screen, the phone 14 is equipped with a touch sensitive display screen, as a virtual keyboard.

The phone MMI or a MMI connected or coupled to the phone 14 allows the user 10 to give or not her or his approval for an authorization relating to a transaction after a phone request.

The phone 14 is configured to request its user 10 whether she or he, as a user of the PC 12 and the phone 14, does or does not approve a requested transaction authorization.

Such a user approval request is presented e.g. through the phone MMI to the user 10.

To give her or his approval, the user 10 may use the phone MMI, an MMI connected or coupled to the phone 14, an embedded sensor(s), and/or one or several accessories, like e.g. a biometric sensor(s), connected or coupled to the phone 14.

To give her or his approval (or refusal), the user 10 may depress one or several predetermined keys of the keyboard 144, such as "OK" (or "Cancel" respectively).

Alternatively or additionally, the user 10 may provide a Personal Identity Number (or PIN) or the like and/or allows the phone 14 to capture one or several biometric prints relating to the user 10, as provided User Authentication Data (or UAD) to be successfully verified by or through the phone 14.

The provided UAD, i.e. that is entered by the user 10 and/or that is captured, through one or several sensors, by the phone 14 (and/or a device(s) cooperating locally with the phone 14), may be used for generating a first cryptogram to be sent to the server side. The generated first cryptogram that depends on the provided UAD allows transmitting securely the concerned UAD to the second server 110, so as to be verified securely at the server side.

The UAD includes data that is known to the user 10, like e.g. a PIN, a password, a passcode and/or user credentials, such as a One Time Password (or OTP), and/or data that belongs to the user 10, like e.g. one or several finger prints, one or two palm prints, one or two iris and/or a face, as one or several biometric prints relating to the user 10.

The phone memory(ies) stores preferably in a temporary manner the provided UAD.

The phone memory(ies) stores a DPAN, as a (digital) token, a PAN alias and/or a PAN alternate, as data relating to a user account, to be received preferably from the second server 110. The data relating to a user account is used for identifying a bank user account or the like at the server side. The data relating to a user account is to be associated with e.g. a first (payment transaction) cryptogram, as a first cryptogram, to be issued from the phone 14 by executing the payment transaction application while using preferably the provided UAD.

The phone memory(ies) (or a device, like e.g. an SE, cooperating with the phone 12) stores one (or several) predetermined key(s) that is(are) shared with the server side.

At least one key may be used for generating a first cryptogram.

The key may be a limited use key, like e.g. a single use key or termed a session key, that is used e.g. in a certain predefined time period and/or a certain count of use for a predefined number of transactions, like e.g. one, two or more transactions.

Alternately, instead of a limited use key, the key is permanent or termed static.

The key may have been previously loaded during a phone manufacturing process before the phone issuance or downloaded from a remote server after the phone issuance.

Once received from an external entity, like e.g. the second server 110, the phone memory(ies) stores preferably, at least in a temporary manner, the transaction data, such as a transaction amount, a transaction currency, a transaction date and/or other data.

The phone memory may store an Application Transaction Counter (or ATC) and/or other data that changes from a transaction to another transaction. As known per se, an ATC value is incremented at each transaction.

The phone memory(ies) may store (bank) card data, such as e.g.:
a Card Type;
a Name on Card;
a Card number;
a Card Verification Value (or CVV); and/or
an Expiry Date (or ED).

The reference UAD is preferably not stored at the phone 14 side.

The phone 14 is preferably configured to generate a first cryptogram.

To generate a first cryptogram, the phone 14 uses the key, the transaction data and a predetermined algorithm, like e.g. a Data Encryption Standard (or DES) or 3DES type algorithm that is shared with the second server 110, as a user approval verification server.

To generate the first cryptogram, the phone 14 also uses preferably the provided UAD.

The phone 14 is adapted to send to the second server 110 a request for authorizing the transaction accompanied with e.g. the (generated) first cryptogram that is generated with or without the provided UAD and/or information relating to the depressed keys, like e.g. "OK" or "cancel", as data relating to a user approval and a kind of a (digital) user signature.

The phone 14 may be arranged to send to the second server 110 further data, like e.g. the transaction data, that is used to generate the first cryptogram.

The first server 16, as a merchant server (or the like), is connected, through a bi-directional wire or wireless link 17, to the network 13.

The first server 16 is hosted by a computer with data processing means, data storing means and one or several I/O interfaces.

The first server 16 manages a set of one or several products and/or services that the first server 16 offers through an (electronic) (payment) transaction(s).

The first server 16 stores or accesses a memory that contains a database including a transaction amount, a transaction currency and/or other data, as transaction data that is associated with each product or service that is thus offered.

The first server 16 is able to receive a message including one or several products and/or one or several services that the user 11 desires to buy (or rent), as a request for authorizing a transaction.

The first server 16 is able to determine data relating to the requested transaction, like e.g. a transaction amount and/or other data, that is associated with the product(s) and/or service(s) that the user 11 desires to buy (or rent).

The first server 16 is able to provide the PC 12 with the determined transaction data, so as to perform a corresponding transaction.

The first server 16 is able to receive a message originating from the client device side, like e.g. the PC 12, and that includes a request for authorizing a transaction accompanied with an Id-PAN.

The first server 16 does not interpret the Id-PAN.

The first server 16 sends preferably to the payment network 18 a message including a request for getting one or several identifiers relating to a second server accompanied with the Id-PAN. The second server identifier(s), like e.g. an IP address, allow(s) addressing the second server 110.

The first server 16 is arranged to send, possibly based on a received second server 110 identifier(s), to the second server 110 a message that includes a request for authorizing a transaction along with the Id-PAN and the transaction data.

The first server 16 is adapted to receive from the second server 110 a message that includes a response for authorizing the transaction along with a user approval (verification) result and the Id-PAN.

The first server 16 is adapted to decide, based on the user approval result, i.e. a user approval or a user refusal, to validate or invalidate the transaction.

If the first server 16 validates the transaction, then the first server 16 is able to send to the second server 110 a message that includes a request for authorizing a transaction along with the Id-PAN and the transaction data.

Otherwise, i.e. if the first server 16 invalidates the transaction, then the first server 16 may be able to send to the first device 12 and/or the second device 14 a message that includes a transaction refusal.

The first server 16 plays a role of an intermediary entity between the client device, the payment network 18, the second server 110 and preferably a server (not represented) that manages, possibly according to a financial aspect, the bank user account.

Instead of exchanging with the second server 110, the first server 16 may carry out the functions carried out by the second server 110 that are described infra.

The payment network 18 allows routing preferably data that originates from the client device side to a (bank issuer) server that the payment network 18 identifies.

The payment network 18 is used for routing data between the first server 16, the second server 110 and preferably a server (not represented) that manages, possibly according to a financial aspect, the bank user account.

The payment network 18 is adapted to extract from the Id-PAN the bank issuer identifier.

The payment network 18 accesses a database stored in a memory (not represented) that is present within or connected to the payment network 18.

The database may include a correspondence table. The correspondence table includes, for one or several identifiers, like e.g. a BIN or an IIN, as a (bank) issuer identifier, and an identifier(s), such as e.g. a URI and/or a URL, relating to a user approval verification server, as the second server 110, to be addressed for a transaction in progress (and to be processed by the concerned server).

The payment network 18 is arranged to get, based on the bank issuer identifier, and send to the first server 16 one or several identifiers relating to the second server 110.

The payment network 18 is connected (or coupled), through preferably a bi-directional wire link 111, to the second server 110, as a user approval verification server.

The second server 110 is hosted by a computer with one or several processors, as data processing means, one or several memories, as data storing means, and one or several I/O interfaces for exchanging data with an external entity (ies), like e.g. the first server 16.

The second server 110 processor processes, controls and communicate(s) internally data with all the other components incorporated within the second server 110 and, through the server I/O interface(s), with the second server 110 exterior.

The second server 110 processor executes or runs at least an invention user approval verification application.

The second server 110 stores or accesses the invention user approval verification application.

The second server 110 stores or accesses, for each user account, corresponding reference UAD, when applicable.

The second server 110 memory(ies) (or a device cooperating with the second server 110) stores one (or several) predetermined key(s) that is(are) shared with the second device side.

At least one key may be used for generating a second cryptogram.

The key may be a limited use key, like e.g. a single use key or termed a session key, that is used e.g. in a certain predefined time period and/or a certain count of use for a predefined number of transactions, like e.g. one, two or more transactions.

Alternately, instead of a limited use key, the key is permanent or static.

The key may have been previously generated or loaded at the server side.

The second server 110 is configured to receive a message including a request for a user authorization for a (requested) transaction along with an Id-PAN, as an identifier relating to a user account, and transaction data.

The Id-PAN includes at least in part a phone identifier(s) and possibly a CVV and/or a card number.

The second server 110 accesses, within its memory or a memory of another server, the transaction data, the Id-PAN, an associated PAN and an associated DPAN or the like, as data relating to a user account. The Id-PAN and its associated DPAN are both data relating to the user account.

The second server 110 is arranged to retrieve, based on the Id-PAN, at least in part the phone identifier, like e.g. the MSISDN. The second server 110 may complete the available data relating to the phone identifier by predetermined data, like e.g. additional international format data for a phone identifier, that is accessible from the second server 110, i.e. stored at the second server 110 side, so as to get a complete phone identifier.

The second server 110 is adapted to get, based on the Id-PAN, the DPAN or the like, as data relating to a user account.

The second server 110 is arranged to send, based on the retrieved phone identifier, to the phone 14 a message including a request for getting a user approval relating to the transaction along with the transaction data and the DPAN or the like, as data relating to a user account.

The second server 110 is configured to receive a message including a request for authorizing the transaction along with data relating to a user approval.

The data relating to a user approval may be information relating to a depressing of one or several keys, like e.g. "OK" or "cancel", or a first cryptogram depending (or not) on UAD that is provided at the client device side.

The second server 110 is adapted to determine, based on the (received) data relating to a user approval, a user approval result.

To determine, based on the (received) data relating to a user approval, a user approval result, the second server 110 is preferably configured to generate (or let generate) a second cryptogram, as a reference cryptogram and an expected cryptogram, as a kind of a (digital) user signature to be matched, in order to verify a user approval and preferably authenticate a user that has provided UAD at a client side.

To generate a second cryptogram, the second server 110 (or another entity accessible from the second server 110) uses the key, the transaction data and a predetermined algorithm that is shared with the client device side, as a user approval data generation device.

To generate the second cryptogram, the second server 110 (or another entity accessible from the second server 110) also uses preferably the reference UAD.

Once the second cryptogram is generated, the second server 110 is configured to compare the (received) first cryptogram to the second cryptogram.

If the second cryptogram does not match the first cryptogram, then the second server 110 stores a user refusal, as a user approval (verification) result and a cryptogram verification result.

Otherwise, i.e. if the second cryptogram matches the first cryptogram, the second server 110 stores a user approval, as a user approval result and a cryptogram verification result.

The second server 110 is configured to store (or let store) the user approval result, the PAN and/or data relating to a user account, and the associated transaction data.

The second server 110 is adapted to send to the first server 16 a response for authorizing the transaction along with the user approval result, i.e. a user approval or a user refusal, and the Id-PAN.

The second server 110 may be arranged to send to the first server 16 further data, like e.g. the transaction data, that is used to generate the second cryptogram.

The second server 110 is adapted to receive from the first server 16 a message including a request for authorizing the transaction along with the Id-PAN.

The request for authorizing the transaction may be accompanied with further data, like e.g. the user approval result and/or the transaction data.

The second server 110 is configured preferably to retrieve, based on the Id-PAN, the transaction data, the identifier(s) relating to a user account, like e.g. the PAN and the data relating to the user account, like e.g. the DPAN, the cryptogram (verification) result.

The second server 110 is arranged preferably to verify whether the cryptogram (verification) result is a positive cryptogram verification, i.e. a user approval, or a negative cryptogram verification, i.e. a user refusal.

The second server 110 is configured to verify, based on the (received) Id-PAN, whether the requested transaction is or is not approved by the user 10.

To verify whether the requested transaction is or is not approved by the user 10, the second server 110 is preferably configured to retrieve, based on the (received) Id-PAN, the user approval result and to compare the user approval result to a user approval.

If the user approval result does not match the user approval, then the second server 110 sends to the first device 12, the phone 14, the first server 16 and/or another server that manages at least financially a user account a message including a transaction refusal.

Otherwise, i.e. if the user approval result matches the user approval, the second server 110 sends, to the first device 12, the phone 14, the first server 16 and/or another server that manages, among a plurality of user bank accounts, a bank account relating to the user 10 a message including a transaction approval.

The second server 110 (or another server) that manages at least financially a user account verifies whether data relating to the user account does or does not satisfy one or several predetermined financial rules.

If the user approval result is a transaction approval and the data relating to the user account satisfies the financial rule(s), then the second server 110 (or another server) sends to the first device 12, the phone 14 and/or the first server 16 a message including a transaction authorization.

Otherwise, i.e. if the user approval result is a transaction approval and the data relating to the user account does not satisfy the financial rule(s), the second server 110 (or another server) sends to the first device 12, the phone 14 and/or the first server 16 a message including a transaction refusal.

Figure 2:
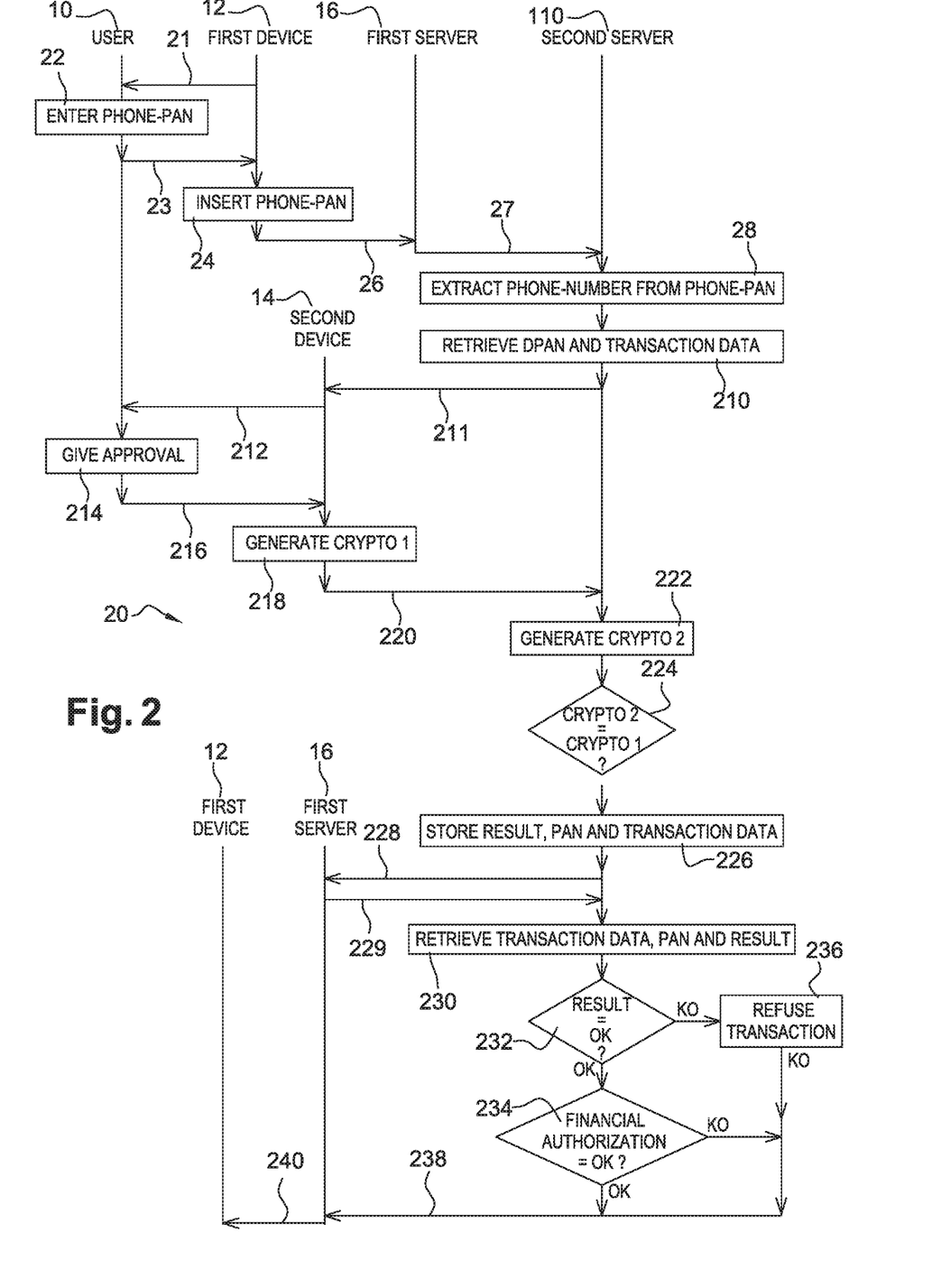
FIG. 2 illustrates a simplified example of a flow of messages exchanged between notably a user, the PC, the phone, the merchant server and the user approval verification server of FIG. 1, so that the user provides, through the PC, at least in part her/his phone identifier and is involved, after a re-routing to a thus identified phone, to approve (or not) a requested transaction, in order to let verify at the server side a user approval result and process the requested transaction accordingly.

FIG. 2 depicts an exemplary embodiment of a message flow 20 that involves the user 10, the PC 12, the phone 14, the first server 16 and the second server 110.

The message flow 20 separates a user approval (or a user refusal) phase from a payment transaction phase. The user approval phase does not impact the message flow relating to the payment transaction phase.

In the explained example, it is assumed that the PC 12 is used for launching a transaction with the first server 16 while identifying the phone 14, as a user terminal, a second device and a generator of a first cryptogram based on a PIN, as provided UAD.

It is also assumed that the second server 110 plays a role of a verifier of the first cryptogram that is generated at the client device by using a reference PIN, as reference UAD, that is accessible at the second server 110 side.

The user 10 accesses, through e.g. a PC 12 browser, the first server 16, as a merchant server.

The user 10 selects a product(s) and/or a service(s) offered through or by the first server 16.

The PC 12 requests, through e.g. the browser, the user 10 to enter an MSISDN relating to her/his phone 14, as an identifier allowing to address the phone 14, while displaying a message 21 including a request, like e.g. "Please enter your mobile phone number".

The user 10 enters 22, through the PC 12 MMI or an MMI connected to the PC 12, the MSISDN relating to her/his phone 14.

The PC 12 receives a message 23 that includes the MSISDN relating to her/his phone 14.

Alternatively, the PC 12 accesses, i.e. stores or is locally connected or coupled to a device, like e.g. an SE, that stores, the MSISDN relating to the user phone 14.

The PC 12 may also request, through e.g. the browser, the user 10 to enter a PAN, as an identifier relating to a user 10 account, while displaying a message including a request, like e.g. "Please enter your PAN", in a PAN data field of a merchant (or first server) web page.

Alternatively, the PC 12 accesses, i.e. stores or is locally connected or coupled to a device, like e.g. an SE, that stores, the PAN relating to the user 10.

The PC 12 inserts 24 at least in part of the MSISDN relating to her/his phone 14 within the PAN. A resulting PAN, as an Id-PAN, includes at least in part the MSISDN relating to her/his phone 14.

The Id-PAN includes preferentially a bank issuer identifier, like e.g. a BIN or an IIN.

Alternatively, instead of a PC insertion of the MSISDN within the PAN to generate an Id-PAN, the user 10 enters 22, through the PC 12 MMI or an MMI connected to the PC 12, in a PAN data field of a merchant (or first server) web page, directly a resulting Id-PAN which includes an MSISDN of her/his phone 14.

According to an essential invention feature, the Id-PAN, as an identifier relating to a user account, includes an identifier relating to a phone 14, as a second device to be involved to request a user approval.

The use of the Id-PAN allows having an out-of-band device for a user approval (or refusal) during a user approval process.

Such an out-of-band user approval process is seamless as a user approval request is pushed to the user 10 who thus does not need to launch any application supported by the phone 14, as a second device.

Such an out-of-band user approval process is also more secure by protecting a CNP transaction by generating a first cryptogram that uses preferably a PIN or any other provided UAD.

The PC 12 sends to the first server 16 a message 26 including a request for authorizing a transaction accompanied with the Id-PAN.

Such a message 26 launches a user approval phase.

The first server 16 identifies preferably after having cooperated with the payment network 18, based on a bank issuer identifier included within the Id-PAN, a corresponding second server 110.

The first server 16 sends to the second server 110 a message 27 including a request for a user authorization for the transaction (in progress) accompanied with the Id-PAN and transaction data.

The second server 110 retrieves preferably, based on the Id-PAN, an associated PAN, as an identifier relating to a user 10 account.

The second server 110 retrieves preferably, based on the PAN, an associated DPAN or the like, as a token and data relating to a user 10 account.

The second server 110 stores or lets store the Id-PAN, the transaction data, the associated PAN and the associated DPAN or the like, as data relating to a user account.

The second server 110 gets or retrieves 28, based on the Id-PAN, the MSISDN relating to the second device 14 to be addressed.

The second server 110 retrieves 210, based on the Id-PAN, the transaction data and the associated DPAN or the like, as data relating to a user account.

Then, the second server 110 sends, based on the phone 14 MSISDN, to the thus identified phone 14 a message 211 including a request for getting a user approval relating to the transaction accompanied with the transaction data and the associated DPAN or the like.

The phone 14 requests 212 its user whether she or he does or does not approve a requested transaction authorization.

The phone 14 displays or lets display 214 a message 212 like e.g. "please enter your PIN to approve the transaction".

The user 10 provides a PIN by entering, through e.g. the phone 14 MMI or an MMI connected to the phone 14, the PIN 216.

Alternately, the phone 14 captures or lets capture one or several fingerprints and/or other biometric prints relating to the user 10.

The phone 14 (or a device, like e.g. an SE, that cooperates with the phone 14) uses preferably the provided PIN, the transaction data, a key that is locally accessible (i.e. stored by the phone 14 or a device, like e.g. an SE, that cooperates with the phone 14) and a predetermined cryptogram generation algorithm that is shared with the second server 110, as a cryptogram verification server, so as to generate a first cryptogram CRYPTO1.

The phone 14, as a second device, supports a payment transaction application, like e.g. an EMV type application that computes a first cryptogram CRYPTO1 that depends preferably on a provided PIN, as provided UAD.

The phone 14 generates 218 or lets generate CRYPTO1 that depends on the provided PIN.

The phone 14 sends to the second server 110 a message 220 including the CRYPTO1, as data relating to a user approval, and possibly the associated DPAN or the like, as data relating to a user account.

The second server 110 identifies preferably the second device that sends the received message 220.

The second server 110 retrieves, based on the identified phone 14 or the DPAN or the like, preferably a reference PIN, the transaction data, a key accessible at the second server 110 side and shared with the phone 14, and the cryptogram generation algorithm shared with the phone 14, so as to generate a second cryptogram, as a reference cryptogram.

The second server 110 generates 222 or lets generate CRYPTO2, as an expected cryptogram, that depends on a reference PIN that is accessible at the second server 110 side.

The second server 110 verifies 224 whether the (received) CRYPTO1 does or does not match the (generated) CRYPTO2.

If the CRYPTO1 matches the CRYPTO2, then the second server 110 authenticates successfully the user 10. Such a positive cryptogram verification ensures a user authentication (the provided UAD is the correct one, i.e. the reference UAD), an authenticity of the phone 14 (only the one that supports an invention user approval application) and a data integrity, i.e. the data used for generating the CRYPTO1 (and thus the CRYPTO2) does not undergo a data alteration which leads otherwise to failing the cryptogram verification at the server side.

Otherwise, i.e. if there is a discrepancy between the CRYPTO1 and the CRYPTO2, the second server 110 fails to authenticate the user 10.

The second server 110 determines, based on the (received) CRYPTO1, a user approval result, i.e. when the provided PIN matches the reference PIN, a user approval or, when the provided PIN does not match the reference PIN, a user refusal.

The second server 110 stores 226 a cryptogram verification result, as a user approval result in association with the (retrieved) PAN and the (retrieved) transaction data.

The second server 110 sends to the first server 16 a message 228 that includes a response for authorizing the transaction accompanied with the user approval result and the Id-PAN.

Such a message 228 terminates the user approval phase.

The first server 16 validates or invalidates preferably, based on the user approval result, the transaction.

Optionally, if the first server 16 validates the transaction, i.e. the user approval result is a user approval, the first server 16 sends to the second server 110 a message 229 including a request for authorizing the transaction accompanied with the Id-PAN.

Such a message 229 launches a payment transaction phase.

The second server 110 then retrieves 230, based on the Id-PAN, the transaction data, the PAN and the user approval result.

The second server 110 verifies 232 whether the requested transaction is or is not approved by the user 10.

If the user approval result is a user refusal, then the second server 110 refuses 236 the transaction and sends to the first server 16 a message 238 including a transaction refusal.

Otherwise, i.e. if the user approval result is a user approval, the second server 110 verifies 234 or lets verify (by another server (not represented)) whether the data relating to a user account that is associated with the PAN does or does not satisfy one or several predetermined financial rules.

If the data relating to the user account does not satisfy the financial rule(s), then the second server 110 (or the other server) does not perform the requested transaction and sends to the first server 16 a message 238 including a transaction refusal.

Otherwise, i.e. if the data relating to the user account satisfies the financial rule(s), the second server 110 (or the other server) performs the requested transaction and sends to the first server 16 a message 238 including a transaction approval.

Once the first server 16 has received the message 238 with a verification result, i.e. a transaction approval or a transaction refusal, the first server 16 does or does not perform the transaction and sends to the PC 12 a message 240 including a transaction approval or a transaction refusal respectively.

Such a message 240 terminates the payment transaction phase.

The invention solution allows securing a transaction while getting, through an involvement thanks to the device that launches a requested transaction, another device that requests an explicit user approval that is securely verified at the server side.

The invention solution allows thus securing a transaction by adding an out-of-band user approval while authenticating preferably the user.

The invention solution does not need to use any SE at the client device side.

The invention solution does not suffer from any time-out relating to a transaction since the user approval phase is distinct from the transaction phase.

The invention solution is compatible notably with the existing merchant infrastructure.

Such an invention transaction authorization method allows re-using an existing bank infrastructure reducing thus a technical complexity and corresponding costs to offer a secure user authentication service.

The invention solution does not need to involve a lot a client device user, except for submitting her/his approval (or refusal) possibly with user authentication data, when applicable (i.e. when these data are to be provided by the user).

The invention solution is compatible notably with the existing merchant or retailer server.

Such an invention authorization method allows re-using an existing back-end system infrastructure reducing thus a technical complexity and corresponding costs to offer a transaction authorization service.

The embodiment that has just been described is not intended to limit the scope of the concerned invention. Other embodiments may be given. As another embodiment example, instead of two servers 16 and 110 that are involved, only one server allows authorizing (or not) a transaction. As still another embodiment example, instead of the PC 12 and the phone 14 that are involved at the client side, only one single device, like e.g. a mobile phone, allows issuing data relating to a user approval to be successfully verified at the server side, so as to continue an execution of a transaction authorization process.

The invention claimed is:

1. A method for authorizing a transaction, comprising:
generating, by or through a first device, an Id-PAN, the Id-PAN including a bank issuer identifier and at least in part a second device identifier, the second device identifier allowing to address the second device;
sending, by the first device to a first server, a first message including a request for authorizing a transaction accompanied with the Id-PAN;
sending, by the first server to a payment network, a message including a request for getting at least one identifier relating to a second server accompanied with the Id-PAN, the at least one second server identifier allowing to address the second server;
extracting, by the payment network, the bank issuer identifier from the Id-PAN;
getting, by the payment network, based upon the bank issuer identifier, at least one second server identifier;
sending, by the payment network, to the first server, the at least one second server identifier;
sending, by the first server to the second server, a second message including a request for a user authorization for the transaction accompanied with the Id-PAN and transaction data;
retrieving, by the second server, based upon the Id-PAN, the second device identifier and user account data;
sending, by the second server, based upon the second device identifier, to the second device a third message including a request for getting a user approval relating to the transaction accompanied with the transaction data and the user account data;
requesting a user, by the second device, whether the second device user does or does not approve a requested transaction authorization;
sending, by the second device to the second server, a fourth message including a request for authorizing the transaction accompanied with user approval data;
determining, by the second server, based upon the user approval data, a user approval result, and sending to the first server a fifth message including a response for authorizing the transaction accompanied with the user approval result and the Id-PAN;
sending, by the first server, to the second server a sixth message including a request for authorizing the transaction accompanied with the Id-PAN;
verifying by the second server, based upon the Id-PAN, whether the requested transaction is or is not approved by the user; and
sending by the second server to a server a seventh message including a verification result.

2. The method according to claim 1, wherein the user of the second device approves the requested transaction authorization by depressing at least one predetermined key at the second device side.

3. The method according to claim 1, wherein the second device user approves the requested transaction authorization by providing user authentication data to be successfully verified by or through the second device.

4. The method according to claim 3, wherein the user authentication data includes at least one element of a group comprising:
a Personal Identity Number;
at least one biometric print;
user credentials;
a user name; and
a password.

5. The method according to claim 3, wherein the second device generates a cryptogram, as user approval data, by using a predetermined cryptogram generation algorithm and the second server generates an expected cryptogram by using the cryptogram generation algorithm, the second server verifies whether the expected cryptogram does or does not match the cryptogram, the second server stores a cryptogram verification result, the user account identifier and the transaction data.

6. The method according to claim 5, wherein, after having received the sixth message, the second server retrieves, based upon the Id-PAN, the transaction data, the user account identifier and the cryptogram verification result.

7. The method according to claim 6, wherein the second server verifies whether the cryptogram verification result is a positive cryptogram verification or a negative cryptogram verification.

8. A system for authorizing a transaction,
wherein, the system comprising a payment network, a first device, a second device, a first server and a second sever, the first device is configured to:
generate an Id-PAN, the Id-PAN including a bank issuer identifier and at least in part a second device identifier, the second device identifier allowing to address the second device; and send, to a first server, a first message including a request for authorizing a transaction accompanied with the Id-PAN;

wherein the first server is configured to send, to the payment network, a message including a request for getting at least one identifier relating to a second server accompanied with the Id-PAN, the at least one second server identifier allowing to address the second server;

wherein the payment network is configured to:
  extract the bank issuer identifier from the Id-PAN;
  get, based upon the bank issuer identifier, at least one second server identifier; and
  send, to the first server, the at least one second server identifier;

wherein the first server is configured to send, to the second server, a second message including a request for a user authorization for the transaction accompanied with the Id-PAN and transaction data;

wherein the second server is configured to:
  retrieve, based upon the Id-PAN, the second device identifier and user account data; and
  send, based upon the second device identifier, to the second device, a third message including a request for getting a user approval relating to the transaction accompanied with the transaction data and the user account data;

wherein the second device is configured to:
  request a user whether the second device user does or does not approve a requested transaction authorization; and
  send, to the second server, a fourth message including a request for authorizing the requested transaction accompanied with user approval data;

wherein the second server is configured to:
  determine, based upon the user approval data, a user approval result; and
  send, to the first server, a fifth message including a response for authorizing the transaction accompanied with the user approval result and the Id-PAN;

wherein the first server is configured to send, to the second server, a sixth message including a request for authorizing a requested transaction accompanied with the Id-PAN; and wherein the second server is configured to:
  verify, based upon the Id-PAN, whether the requested transaction is or is not approved by the user; and
  send, to a server, a seventh message including a verification result.

* * * * *